United States Patent [19]

McRight et al.

[11] Patent Number: 5,425,124
[45] Date of Patent: Jun. 13, 1995

[54] LIGHTPIPE PROVIDING WIDE ANGLE OUTPUT

[75] Inventors: William C. McRight, Round Rock; Mary E. Kingsbury, Taylor, both of Tex.

[73] Assignee: Rolm Company, Santa Clara, Calif.

[21] Appl. No.: 217,140

[22] Filed: Mar. 23, 1994

[51] Int. Cl.⁶ ............................................. G02B 6/10
[52] U.S. Cl. ................................... 385/123; 385/115; 385/125
[58] Field of Search ............... 385/123, 124, 125, 126, 385/115, 116, 117, 120, 12, 32, 147

[56] References Cited

U.S. PATENT DOCUMENTS 3,699,950 10/1972 Humphrey, Jr. et al. ...... 385/117 X
4,422,719 12/1983 Orcutt ............................... 385/123
4,466,697 8/1984 Daniel ............................... 385/123
5,071,222 12/1991 Laakmann et al. ............. 385/134 X
5,267,995 12/1993 Doiron et al. .................. 385/123 X Primary Examiner—Rodney B. Bovernick
Assistant Examiner—Phan T. H. Palmer
Attorney, Agent, or Firm—Michael B. Einschlag

[57] ABSTRACT

A lightpipe which outputs light in a wide angle output pattern. An embodiment of the inventive lightpipe has a longitudinal cross section which has at least one section with a varying width. In addition, a preferred embodiment of the inventive lightpipe has a section with increasing width of the cross section near an input end of the lightpipe and a section with decreasing width of the cross section near an output end of the lightpipe.

5 Claims, 1 Drawing Sheet

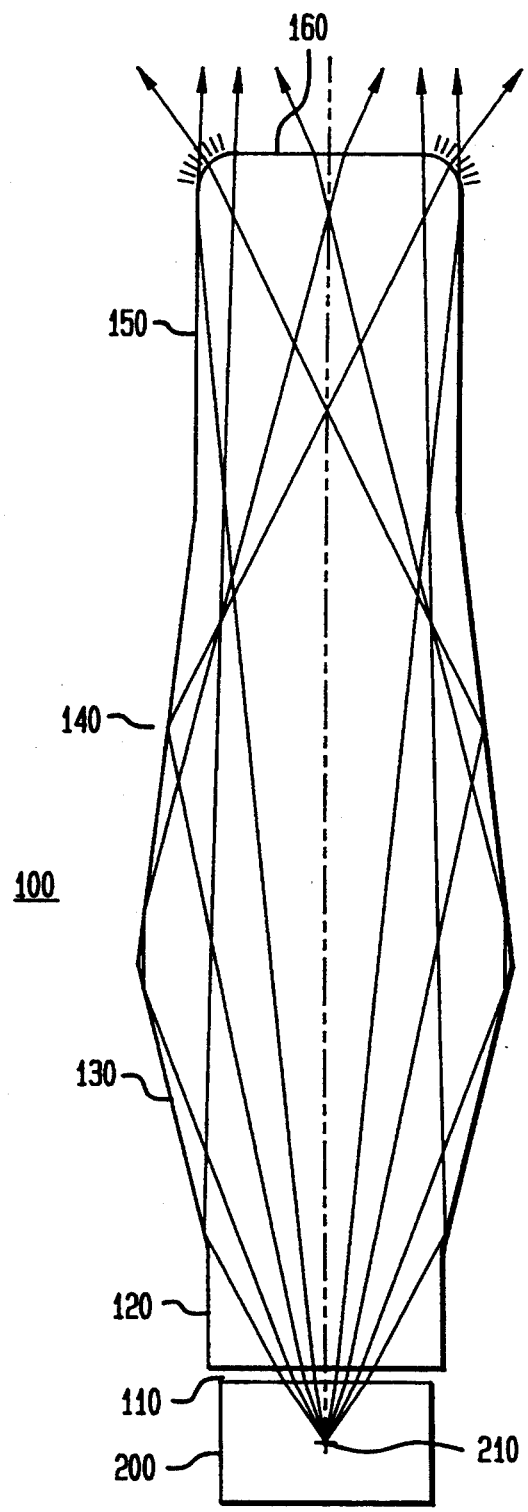

LIGHTPIPE PROVIDING WIDE ANGLE OUTPUT

TECHNICAL FIELD OF THE INVENTION

The present invention pertains to a light-transmission device that captures light from a source, transmits the light for a distance, and outputs the light in a wide angle viewing pattern. In particular, an embodiment of the present invention is a lightpipe which provides wide angle output.

BACKGROUND OF THE INVENTION

Present day terminal equipment such as telephones need to be fabricated to have visible indicators. In many such telephones, a light emitting diode ("LED") is used as a source of light for such visible indicators. The LED light output is controlled by the telephone electronics and the light output is transmitted from the LED to the surface of the telephone to provide information to a user for example, to indicate that a particular telephone key pad or function is being used. It is advantageous for the light output at the surface of the telephone to have a wide angle output pattern so that the indicator can be seen easily by a user from a wide viewing angle.

In the prior art, in fabricating such indicators, an LED is mounted relatively close to the surface of the telephone so that light output from the LED only has to travel a short distance through a conductor, for example, a lightpipe, to reach the surface of the telephone. A lightpipe typically used in such prior art configurations is a cylindrical tube of plastic, for example, acrylic.

Newer technology used to fabricate telephones sometimes requires mounting LEDs further from the surface of the telephone than was previously the case in the prior art. When prior art, cylindrical tube lightpipes are used in the newer telephone configurations, light is output from the end of the lightpipe in a narrow angle output pattern and provides an unsatisfactorily narrow viewing angle.

In light of the above, there is a need in the art for a lightpipe which outputs light in a wide angle output pattern.

SUMMARY OF THE INVENTION

Advantageously, embodiments of the present invention satisfy the above-identified need in the art by providing a lightpipe which outputs light in a wide angle output pattern."In particular, a lightpipe fabricated in accordance with the present invention comprises a lightpipe wherein at least one section has a longitudinal cross section of varying width.

In further embodiments of the present invention, the lightpipe comprises: a first section disposed near an input end of the lightpipe having a width which increases as distance increases along the lightpipe away from the input end and a second section disposed near an output end of the lightpipe having a width which decreases as distance increases along the lightpipe away from the input end.

In a preferred embodiment of the present invention, the lightpipe comprises: (a) a input section, disposed at an input end of the lightpipe, having a substantially constant width; (b) a second section, disposed adjacent the input section, having a width which increases as distance increases along the lightpipe away from the input end; (c) a third section, disposed adjacent the second section, having a width which decreases as distance increases along the lightpipe away from the input end; and (d) a output section, disposed adjacent the third section, having a substantially constant width. Advantageously, the sections having constant width are disposed at the ends of the lightpipe and are utilized to insert the lightpipe into support structures, for example, to insert the lightpipe into a hole in a circuit board.

BRIEF DESCRIPTION OF THE FIGURE

FIG. 1 shows, in pictorial form, a longitudinal cross section of a preferred embodiment of a lightpipe fabricated in accordance with the present invention.

DETAILED DESCRIPTION

FIG. 1 shows, in pictorial form, a longitudinal cross section of lightpipe 100 which is a preferred embodiment of the present invention. Lightpipe 100 is an injection molded, acrylic plastic lightpipe having the longitudinal cross section shown in FIG. 1. Further, lightpipe 100 has a 3-D shape which is visualized by rotating lightpipe 100 shown in FIG. 1 about an axis longitudinally disposed along the center of lightpipe 100 and in the plane of FIG. 1. However, embodiments of the present invention are not limited to such figures of revolution and may be fabricated as a thin, relatively flat, 3-D object having the longitudinal cross section shown in FIG. 1 or a similar cross section.

As shown in FIG. 1, holder 200 contains light emitting diode 210 (LED 210). In a typical configuration, holder 200 is a rectangular box having planar dimensions as shown in FIG. 1 of approximately 0.10" on each side and a depth in a dimension perpendicular to the plane of FIG. 1 of approximately 0.060". As further shown in FIG. 1, light rays emitted by LED 210 substantially appear as if they are emitted by a point source in a "fan-like" shape having an approximately 90° included angle. The light rays enter lightpipe 100 from input end 110. Input end is substantially flat and has a width that is wider that the "fan-like" shape of the output from LED 210. This is done to enable efficient capture of light emitted by LED 210.

As shown in FIG. 1, section 120 of lightpipe 100 has a constant width. Constant width section 120 is used to insert lightpipe 100 into a support structure. For example, in a preferred embodiment, the support structure is a circuit board and lightpipe 100 is inserted into a hole in the circuit board. However, embodiments of the present invention are not required to have a section of constant width like section 120.

As further shown in FIG. 1, section 130 of lightpipe 100 has an expanding width. Expanding width section 130 width advantageously enables light rays to travel a substantial distance along lightpipe 100 before striking a wall; some of the light rays pass into section 140 before striking a wall and some of the light rays strike the wall in section 130. This is advantageous for two reasons. First, as will be described below, rays which strike the wall in section 140 are deflected at a larger angle than would have been the case if they struck a wall where the width of the cross section were constant, i.e., parallel walls. This provides a wider viewing angle for the reflected rays which exit lightpipe 100 from end 160. Second, rays which strike the wall in section 140 strike the wall at a smaller angle than would be the case for parallel walls. This reduces loss of light since the angle for total internal reflection for acrylic for a typical LED emitting "red" light is about 42°. Note that in embodiments that omit constant width section 120, the width variation of section 130 may be extended to input end 110. Also note that some of the rays which emanate from LED 210 travel along the lightpipe and only strike the wall in section 150 before exiting and that some rays do not strike the walls of the lightpipe at all before exiting.

As further shown in FIG. 1, section 140 of lightpipe 100 has a decreasing width. Section 140 with decreasing width advantageously enables light rays to be reflected at a larger angle than would have been the case for parallel walls.

As still further shown in FIG. 1, section 150 of lightpipe 100 has a constant width. Constant width cross section 150 is used to insert lightpipe into a support structure. For example, in a preferred embodiment, the support structure is a top plate of a telephone and lightpipe 100 is inserted into a hole in the top plate of the telephone. However, embodiments of the present invention are not required to have a section of constant width like section 150. Note, in embodiments which omit constant width section 150, the width variation of section 140 may be extended to output end 160.

Lastly, the light rays exit output end 160 of lightpipe 100. As shown in FIG. 1, advantageously the rays exit output end 160 to provide a wide-angle output pattern. Further, in a preferred embodiment, output end 160 has a matte finish surface with rounded edges. The matte finish serves to diffuse the light rather than to focus it and it also improves the appearance of the indicator provided by the portion of lightpipe 100 that extends through the top plate of the telephone.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. In particular, although the above-described embodiment comprised a lightpipe having a cross section with both an increasing and a decreasing width, further embodiments may be fabricated having only a decreasing width or with a section having a decreasing width and a section having a constant width. Still further embodiments may be fabricated having several sections of increasing and/or decreasing widths with varying rates of increase or decrease. Yet still further embodiments of the present invention may be fabricated having constant width sections disposed between sections of increasing and decreasing widths. Lastly, it is understood that the lightpipes may be fabricated having addition support structures on the outside of the lightpipe and being comprised of the same plastic which is used to form the lightpipe itself. For example, such support structures may be in the form of legs or runners to enable several lightpipes to be supported together in a telephone.

What is claimed is:

1. A lightpipe comprised of a light transmissive medium wherein at least one section of the longitudinal cross section of said lightpipe has a varying width, wherein said at least one section comprises:
   a first portion of said at least one section disposed proximate to an input portion having a substantially constant width; and
   a second portion of said at least one section, disposed adjacent the first portion of said at least one section, having a width which decreases as distance increases along the lightpipe away from the input end.

2. A lightpipe comprised of a light transmissive medium wherein at least one section of the longitudinal cross section of said lightpipe has a varying width, wherein said at least one section comprises:
   a first portion of said at least one section, disposed near an input end of the lightpipe, having a width which increases as distance increases along the lightpipe away from the input end; and
   a second portion of said as least one section, disposed near an output end of the lightpipe, having a width which decreases as distance increases along the lightpipe away from the input end.

3. The lightpipe of claim 2 further including:
   an input portion of said lightpipe, having a substantially constant width, disposed adjacent to said first portion of said at least one section; and
   an output portion of said lightpipe, having a substantially constant width, disposed adjacent to said second portion of said at least one section.

4. The lightpipe of claim 3 wherein the lightpipe has an output end having a matte finish.

5. The lightpipe of claim 2 further including at least one section having a substantially constant width.

* * * * *